June 14, 1960  M. MONTEL  2,941,078
ANASTIGMATIC CATOPTRIC DEVICE
Filed Feb. 9, 1955  3 Sheets-Sheet 1

INVENTOR
MARC MONTEL
BY
ATTORNEYS

June 14, 1960  M. MONTEL  2,941,078
ANASTIGMATIC CATOPTRIC DEVICE
Filed Feb. 9, 1955  3 Sheets-Sheet 2

INVENTOR
MARC MONTEL
BY Pollard, Johnston, Smythe & Robertson
ATTORNEYS

United States Patent Office 2,941,078
Patented June 14, 1960

2,941,078
ANASTIGMATIC CATOPTRIC DEVICE

Marc Montel, Paris, France, assignor to Centre Nationale de la Recherche Scientifique, Paris, France, a corporation of France Filed Feb. 9, 1955, Ser. No. 487,105

Claims priority, application France Feb. 16, 1954

7 Claims. (Cl. 250—53)

The present invention relates to catoptric devices working at large angles of incidence. Devices of this kind are especially applicable to the formation of real optical images by electro-magnetic radiations of short wavelengths.

The invention also relates to a method of manufacture of such catoptric devices.

It is known that optical images may be formed with reflecting surfaces working at oblique incidence, but the devices actually in existence give images having such large aberrations that it has not been possible to employ them usefully up to the present time. In particular, it is not possible with these known devices to employ radiations of very short wave-lengths, such as X-rays and γ-rays, which at large incidence are reflected in accordance with the laws of geometrical optics. Now, it has been shown by theory that the results obtained with these radiations are superior to those obtained with optical and electronic microscopes in respect of separating power.

Up to the present time, in order to correct these aberrations, and especially astigmatism and anamorphosis of crossed systems, the number of mirrors employed has been increased and the use of deformed systems has been contemplated. Neither of these two solutions is however practical, the first because of adjustment difficulties and the second for manufacturing reasons.

Efforts have been made to palliate these drawbacks and to construct optical systems working by reflection at oblique incidence and resulting, without delicate adjustment, in the production of images free from the most troublesome aberrations, that is to say astigmatism and anamorphosis.

If, in fact, a concave spherical mirror is considered, such as shown at M in Fig. 1, and from which is reflected the mean ray of a beam of light issuing from a point object A, it is known that the reflected beam is supported on two focal curves S' (the sagittal curve) and T' (the tangential curve) which may be taken as similar to elements of straight lines in the case of small fields and which are at right angles to each other and perpendicular to the mean ray at S' and T'.

S' is in the plane of incidence AOC, where O indicates the point of impact and C the centre of the mirror: T' is perpendicular to this plane.

The position of S' and of T' on the mean ray is given by the two standard equations of astigmatism:

$$\frac{1}{OT'} = \frac{2}{R.\cos i} + \frac{1}{OA}$$

$$\frac{1}{OS'} = \frac{2.\cos i}{R} + \frac{1}{OA}$$

where $i$ is the angle of incidence, and $R$ is the radius of curvature. The point at which the section of the reflected beam is the smallest will be at one or the other of these focal straight lines. The focussing is carried out on these focal straight lines and it is thus necessary that at least one of them should be real. If $i$ is fairly large, $\cos i$ is small and we have approximately $OS'=OA$. S is therefore virtual. It is thus on T' that the focussing is generally carried out. It is therefore necessary that $$\frac{2}{R.\cos i} + \frac{1}{OA} > 0$$

and this is quite easy to obtain.

It may thus be said in a general way that, with the exception of the points of the axis at which the angle of incidence $i$ is zero, a system composed of a single mirror is not corrected for astigmatism. It is in general not of any particular advantage to obtain a straight line as an image of a point. By using two mirrors, and under certain conditions of orientation and of size of the rays, the sagittal and tangential images obtained after two reflections can be made to coincide. A system of this kind gives a point image of a point and the system is thus corrected for astigmatism for this pair of points and in general also for a small plane perpendicular to the mean ray around A. But this condition does not remain true if the object has a third dimension.

In order to obtain a good correction with two mirrors, a geometric condition and an algebraic condition must both be fulfilled. In fact, in order that there may be a compensation of the astigmatism of the two mirrors, it is necessary that the parts played by the tangential and sagittal focals should be reversed between the two mirrors, that is to say the sagittal $S'_1$ given by $M_1$ should be the tangential $T_2$ of $M_2$ and vice versa (see Fig. 2). As the focals are at right angles, it is necessary that the planes of incidence of the ray $AO_1$ on the first mirror and that of its reflection $O_1O_2$ on the second mirror should be perpendicular to each other. This is the geometric condition.

The algebraic condition for correction is obtained by applying twice the astigmatism formulae (1)
$$\frac{1}{O_2T'_2} = \frac{2}{R_2.\cos i_2} - \frac{R_1 + 2.O_1A.\cos i_1}{-R_1.O^1A + O_1O_2(R_1 + 2.O^1A.\cos i_1)}$$

(2)
$$\frac{1}{O_2S'_2} = \frac{2.\cos i_2}{R_2}$$

$$-\frac{R_1.\cos i_1 + 2.O_1A}{-O_1A.R_1.\cos i_1 + O_1O_2.(R_1.\cos i_1 + 2.O_1A)}$$

A system of two "crossed" mirrors may in theory readily satisfy the two Formulae 1 and 2 above. As the fields used are in general small, it can be said that there is correction for astigmatism for a small object perpendicular at A to $AO_1$. But the formulae must be satisfied with very great exactness, and practice has shown that it is impossible, or extremely difficult, to obtain correct reproduction with a single pair of mirrors. In addition, by reason of this sensitivity, as soon as the object has a certain thickness, it is impossible to obtain a good image of it.

If $O_1O_2=0$, the above formulae may be re-written as follows:

(3)
$$\frac{1}{O_2T'_2} = \frac{2}{R_2.\cos i_2} + \frac{2.\cos i_1}{R_1} + \frac{1}{O_1A}$$

(4)
$$\frac{1}{O_2S'_2} = \frac{2.\cos i_2}{R_2} + \frac{2}{R_1.\cos i_1} + \frac{1}{O_1A}$$

The correction for astigmatism no longer depends on $O_1A$, but only on the values of the rays and the incidences. If, in addition, $R_1=R_2=R$, and $i_1=i_2$, the quantities $O_2T'_2$ and $O_2S'_2$ are always equal and there is no more astigmatism.

If, on the other hand, the magnification is calculated for the general case, that is to say when $O_1O_2$, $R_1$, $R_2$, $i_1$ and $i_2$ have any values whatever, it can be shown that anamorphosis is present. The magnification is not the same in two directions at right angles to each other, and the image is not similar to the object. This can be very troublesome, since optical methods of correction, anamorphosis distortion correctors, for example, give only mediocre results and the advantage which could be obtained from the use of short wave-lengths is lost. In addition, since the magnifications are different, if it is desired to have a given limit of separation for the whole of the object, it is necessary to take a magnification in one of the directions much greater than the normal value necessary. This leads to an increase in aberration which is sometimes not acceptable. The magnifications are equal, either when $i_1=i_2=0°$, which is the well-known case of centered systems; or when $R_1=R_2=0$ which is the case for plane mirrors. Now, if in the formulae which give the magnification, $O_1O_2=0$, the magnification has the same value in all directions. In this case, anamorphosis has also been eliminated.

The result of the foregoing examination is that it is possible to suppress simultaneously astigmatism and anamorphosis when $O_1O_2=0$, that is to say when the summits of the mirrors employed are in coincidence.

Using the foregoing statements as a basis, the present invention has for its object a catoptric device which has no anamorphosis, nor distortion, nor astigmatism, and which gives without any delicate adjustment a point image of any point of a small object having three dimensions.

The device in accordance with the invention operates at large incidence and is characterised in that it comprises two concave spherical or substantially spherical mirror elements having the same radius of curvature and disposed in such manner that the summits of the mirrors are wholly or substantially in coincidence and that the planes tangential to the summits of each mirror are perpendicular to each other.

The invention has also for its object the combination of at least two devices having two mirrors with a view to correcting a greater number of aberrations and/or to the provision of an optical instrument such as, for example, a microscope; the devices forming a combination of this kind may be parallel or crossed.

The invention will be explained in more detail in the description which follows below, reference being made to the attached drawings in which.

Figure 1:
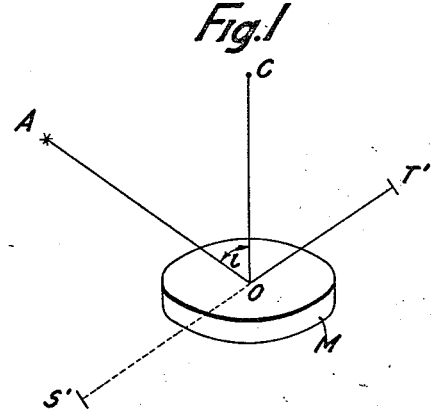
Fig. 1 shows diagrammatically the reflection of a point object on a single spherical mirror.
Figure 2:
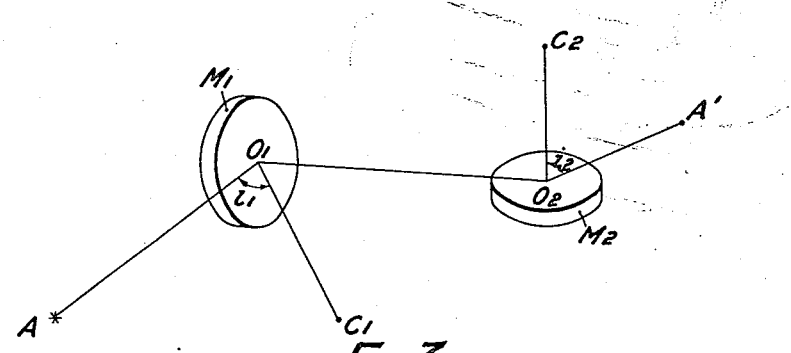
Fig. 2 shows an arrangement of two spherical mirrors intended to correct astigmatism.

Referring now for the sake of clearness to Fig. 2, in which the mirrors $M_1$ and $M_2$ are shown separate, it will be seen that the two mirrors $M_1$ and $M_2$ form a kind of right-angle dihedron of which the sides facing each other are spherical, the summits of the spherical segments being in coincidence or substantially in coincidence on the ridge of the dihedron. It has been sought to verify whether a system of this kind gives only a single image of a point object A when the rays emitted from A are reflected from $M_1$ and then from $M_2$, or, on the contrary, from $M_2$ first and then from $M_1$. Now, it has been shown by calculation that there are in reality two images, except in the case of very high incidences, that is to say when the point object is close to the intersection of the planes tangential to the summits of the spherical mirrors. In this case, the properties of such a system are then very closely allied to those of centered systems, and the image corresponds geometrically with the object; this system has neither astigmatism nor distortion nor anamorphosis.

There may be advantage in employing, instead of spherical mirrors, spherical mirrors deformed by local corrections with a view to the suppression of the residual aberrations and to increase the separating power. In order to determine these local corrections, the optical path of the ray $AOA'$ may be calculated. Then taking any particular ray AI, not shown on the figure, the mirror is re-worked so as to give the same optical path for $AIA'$. For these corrections, account must be taken of the fact that in practice, only the front half of the mirror serves to reflect the rays coming directly from A. There is thus no reason to fear the overlapping of two corrections, one relative to the ray which has been reflected once and the other to the ray twice reflected.

This operation of local re-touches of the mirrors is delicate since the corrections will vary with the angle of incidence on the mirror and especially with the magnification, and this may result in a prohibitive cost. In the case of the devices in accordance with the invention however, the adjustments are greatly simplified by the fact that the relative positions of the mirrors are fixed during their construction.

The association of two or a number of systems, which is a further special feature of the invention, also enables a greater number of aberrations to be corrected. A system may be employed parallel to the first or a crossed system may be used and this latter is the preferable solution.

With a single system, which constitutes a kind of lens, it is possible to obtain a resolving power of 10,000 lines per millimetre, which means that two objects 1000 A. apart can be separated. The calculation which gives the power of separation in the presence of pure diffraction gives a value of 60 A., which proves that with a single system the aberrations are not wholly corrected. With two systems, it is possible to arrive at 700 A., which constitutes an appreciable improvement on the optical microscope.

In the manufacture of the device which forms the object of the invention, it is impossible to machine directly in metal. However, in order to obtain the necessary precision, it is preferable to manufacture a device from glass on which there is subsequently deposited, by any known means, a film of metal.

Figure 3:
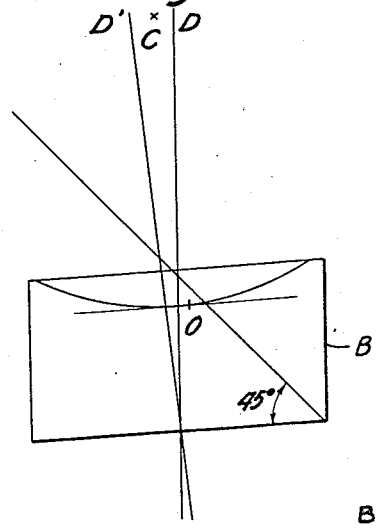
Fig. 3 shows a view in cross-section of the blocks of material from which is cut the optical system in accordance with the invention.

In this case, the following mode of operation, illustrated by way of example in Fig. 3, may be followed.

Each of the two mirrors is made separately, each starting from a cylindrical block B having polished parallel faces. The axis D of the glass cylinder should be substantially parallel to the normal D′ to the plane faces. One of the plane faces is then cut in the concave form of a sphere, the centre C of which is in the vicinity of the axis D of the cylinder. By means of interference rings, the point on this sphere is then determined at which the tangential plane is parallel to the plane face; this point is the summit O. The mirror is then cut at an angle of 45° with respect to the plane, in the vicinity of O, as shown in Fig. 3. This cut is then polished in such a way that the angle of section is exactly equal to 45° and that the plane of the section passes through O.

Figure 4:
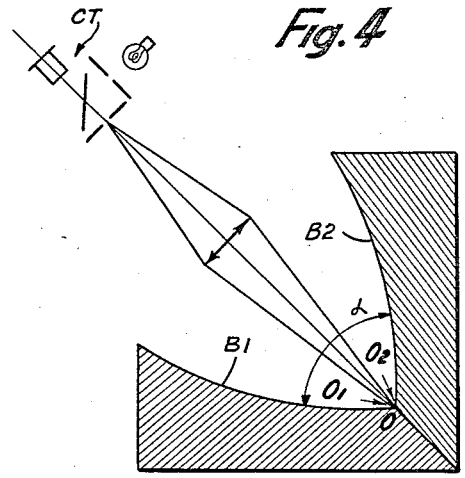
Figs. 4 and 4a show the method of location of the mirrors constituting a device in accordance with Fig. 3.
Figure 4A:
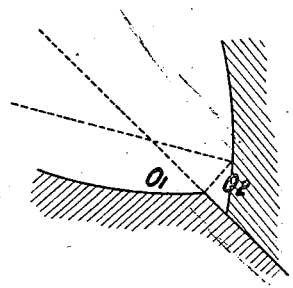

It will be sufficient to grind up to the point O and then to polish finally. The check points on the ground face will in general be sufficiently exact to enable the work to be carried out to a good approximation, so that only small amounts of re-touching will be necessary during the polishing stage. It is this part of the work which is the most delicate and requires the greatest care, since an error in the angles will affect the image, which will become double. The two cut mirrors $B_1$ and $B_2$ (Fig. 4) are then placed with their sections in contact, taking great care to ensure the coincidence of the points $O_1$ and $O_2$. To this end, the two points $O_1$ and $O_2$, coincident at a point O, are simultaneously checked by means of an auto-collimating telescope CT (see Fig. 4). If the two summits are displaced in the plane of the figure, a rotation of the reflected beam, and thus of the return image, is produced in this plane. If there is a transverse displacement, the movement of the beam takes place in the direction at right-angles to the first (see Fig. 4a). It is sufficient to cause the two sections to slide one on the other so as to bring the return image into coincidence with the object cross-wires. The adhesion by optical contact is excellent and if care has been taken to use fairly thick blocks, there is no risk of them becoming detached from each other.

The two glass blocks may also be fixed on an optical square, but the first solution would appear to be preferable.

The two conditions to be observed with care are, on the one hand the angle of 45° of the plane of section with the axis passing through O, and on the other hand, the coincidence of the points O employed. Special attention must be given to the right angle so as to avoid a doubling of the image as with a roof prism with plane faces. If the angle $\alpha$ is not exactly 90°, the adjustment may be completed by applying a slight pressure on the plane faces of the mirrors.

The following practical method has, for example, been followed with good results. The mirrors used are mirrors of 20.42 metres radius. It is an easy matter to measure the radius by measurement of the Newton rings formed between the gauge serving for the manufacture of the mirrors and a standard plane. The diameter of the mirrors is 104 mm. before cutting. The thickness at the edge is in the neighbourhood of 25 mm. The mirrors have been optically polished and are spherical to approximately $\frac{1}{12}$ fringe at 17°. The zone utilised on each mirror is a strip of 0.4 mm. in width by 81 mm. in length. The mirrors are gilded by projection under vacuum. In order to ensure adhesion an undercoating of chromium is used. The two layers are optically opaque in order to avoid certain phenomena which are laible to arise with X-rays in thin layers.

Figure 5:
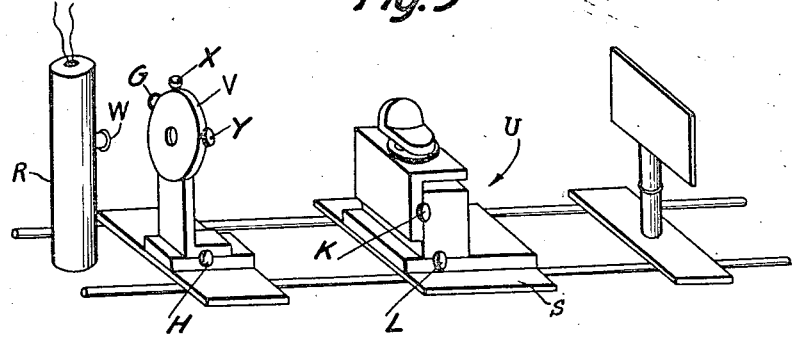
Fig. 5 is a diagrammatic view in perspective of an arrangement for photography by X-rays.
Figure 6:
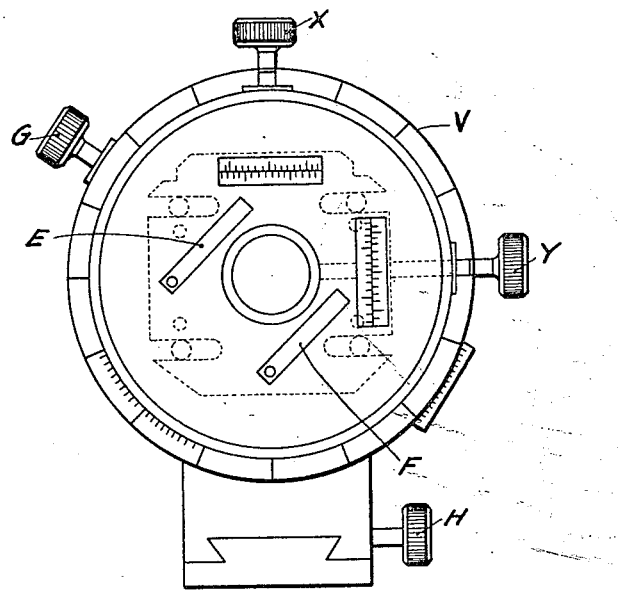
Fig. 6 shows a slide suitable for the arrangement of Fig. 5.

The source of light is constituted by an ordinary tube mounted inside a protecting tube R (Fig. 5) having a window W for the passage of the radiation. The object is mounted on a slide V of which the front view is shown in Fig. 6. This object slide is provided with a stage on which the object is fixed by means of two tongues E, F, acting as springs. A knob G enables the object to be rotated about the axis of the optical system and its position is indicated by means of a graduated scale provided with a vernier. The stage may also be displaced in two directions at right angles by means of the knobs X and Y, the corresponding positions being also indicated scales provided with verniers. The object slide V is fixed on a platform P which moves along an optical bench; a knob H actuating a toothed rack, enables the object slide to be displaced longitudinally with respect to the platform.

Figure 7:
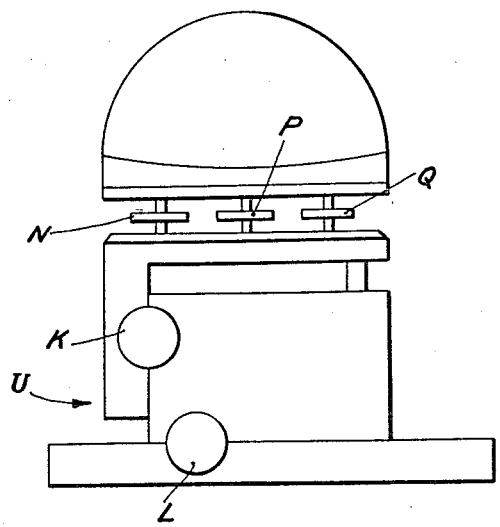
Fig. 7 shows a trolley which carries the optical device.

The optical system is mounted on a trolley U (see Fig. 7) which is rigidly fixed to a platform adapted to move on the optical bench. Means are provided, for example the knobs K and L, for actuating toothed racks, in order to enable the optical system to be displaced in height and longitudinally. The platform may be arranged for small transverse displacements. This optical system is itself mounted on three level-adjusting screws N, P, Q, which enable the adjustments to be made.

A catoptric device constructed in accordance with this invention functions to produce a point image of any point on a small three-dimensional object. Those rays which fall on the intersection of the meeting edges of the mirrors $B_1$ and $B_2$ are simultaneously reflected by both mirrors. Those rays which do not fall on the intersection combine to form the same point image irrespective of which mirror effects the first reflection. The device formed by the two mirrors together thus brings about the formation of an image substantially free from astigmatism, anamorphosis and distortion.

What I claim is:

1. A catoptric device for obtaining a punctual image of any point on a small three-dimensional object, comprising a pair of concave, substantially spherical mirrors having the same radius of curvature and held together with the summits of said mirrors are substantially coincident and the planes tangential to the respective summits of said mirrors perpendicular to each other, whereby said device is rendered substantially free from astigmatism, anamorphosis and distortion.

2. A catoptric system for obtaining a punctual image of any point on a small three-dimensional object, comprising at least two paired mirror devices arranged to form a crossed reflection system, each of said devices comprising a pair of concave, substantially spherical mirrors having the same radius of curvature and held together with the summits of said mirrors substantially coincident and the planes tangential to the respective summits of said mirror perpendicular to each other, whereby said system is rendered substantially free from astigmatism, anamorphosis and distortion.

3. A catoptric system for obtaining a punctual image of any point on a three-dimensional object, comprising at least two paired mirror devices arranged to form a parallel reflection system, each of said devices comprising a pair of concave, substantially spherical mirrors having the same radius of curvature and held together with the summits of said mirrors substantially coincident and the planes tangential to the respective summits of said mirrors perpendicular to each other, whereby said system is rendered substantially free from astigmatism, anamorphosis and distortion.

4. A catoptric device for obtaining a punctual image of any point on a small three-dimensional object, comprising a pair of concave, substantially spherical mirrors having the same radius of curvature, each of said mirrors being constituted by a cut-away cylindrical block of glass one end face of which is formed with an optically finished truly spherical concave surface having its axis substantially coincident with the axis of the cylinder of said block, each of said blocks being cut away over one side thereof and formed thereover with a ground and polished plane surface lying at an angle of 45 degrees to a plane perpendicular to said cylinder axis and tangent to said spherical surface, said plane surface extending through the point of tangency of such plane to said spherical surface, the intersection of said plane surface and said spherical surface forming a concave bordering edge of the mirror, said blocks being positioned together with their respective plane surfaces in face to face contact and with their respective bordering edges and the respective points of tangency aforesaid in substantial coincidence.

5. A device as claimed in claim 4, said spherical surface of each block comprising a vacuum-projected gild coating on an undercoating of chromium.

6. A device as claimed in claim 4, said blocks being held together by the cohesion of said contacting optically finished plane surface.

7. An optical apparatus adapted for the formation of real optical images by radiation of very short wavelengths such as X-rays and gamma-rays, comprising: a source of said radiation; an optical bench; a platform longitudinally movable on said bench; an object-slide movably-mounted on said platform; an object-carrier mounted on said object-slide; means for rotating said object-carrier about the optical axis of said apparatus;

means for displacing said object-carrier in two directions at right angles in a plane perpendicular to said axis; means for displacing said object-carrier longitudinally with respect to said platform in order to vary the magnification; a trolley movable longitudinally on said bench; mounted on said trolley, an optical system comprising a pair of concave spherical mirrors combined in such manner that the summits of said mirrors are substantially coincident in space, the planes tangential to the summits of said mirrors being perpendicular to each other; means for displacing said system longitudinally, in height, and transversely with respect to the axis of said apparatus; and a receiver device for the optical images thus formed and transmitted.

References Cited in the file of this patent

UNITED STATES PATENTS

| | | |
|---|---|---|
| 835,648 | Straubel | Nov. 13, 1906 |
| 1,105,895 | Eppenstein | Aug. 4, 1914 |
| 1,382,261 | Akeley | June 21, 1921 |
| 1,815,992 | Sherts et al. | July 28, 1931 |
| 2,162,590 | Richter et al. | June 13, 1939 |
| 2,482,698 | Tillyer | Sept. 20, 1949 |
| 2,500,604 | Daniel | Mar. 14, 1950 |
| 2,540,821 | Harker | Feb. 6, 1951 |
| 2,557,662 | Kirkpatrick | June 19, 1951 |
| 2,559,972 | Kirkpatrick | July 10, 1951 |
| 2,565,419 | Aitcheson | Aug. 21, 1951 |
| 2,688,094 | Dumond | Aug. 31, 1954 |

UNITED STATES PATENT OFFICE
CERTIFICATION OF CORRECTION

Patent No. 2,941,078              June 14, 1960

Marc Montel

It is hereby certified that error appears in the above numbered patent requiring correction and that the said Letters Patent should read as corrected below.

In the grant, lines 2 and 12, and in the heading to the printed specification, lines 3 and 4, name of assignee, for "Centre Nationale de la Recherche Scientifique, each occurrence, read -- Centre National de la Recherche Scientifique --.

Signed and sealed this 25th day of April 1961.

(SEAL)
Attest:

ERNEST W. SWIDER             DAVID L. LADD

Attesting Officer             Commissioner of Patents